United States Patent
Peters (10) Patent No.: US 12,306,628 B2
(45) Date of Patent: May 20, 2025

(54) STAGGERING MACHINE ARRIVAL TIMES AT WORKSITE LOADING AREA

(71) Applicant: Caterpillar Inc., Peoria, IL (US)

(72) Inventor: Justin Peters, Clayton, NC (US)

(73) Assignee: Caterpillar Inc., Peoria, IL (US)

( * ) Notice: Subject to any disclaimer, the term of this patent is extended or adjusted under 35 U.S.C. 154(b) by 305 days.

(21) Appl. No.: 17/947,033

(22) Filed: Sep. 16, 2022

(65) Prior Publication Data
US 2024/0094724 A1    Mar. 21, 2024

(51) Int. Cl.
*G05D 1/00*    (2024.01)

(52) U.S. Cl.
CPC ......... *G05D 1/0033* (2013.01); *G05D 1/0016* (2013.01); *G05D 1/0027* (2013.01)

(58) Field of Classification Search
CPC .. G05D 1/0033; G05D 1/0016; G05D 1/0027; G06Q 10/06
See application file for complete search history.

(56) References Cited

U.S. PATENT DOCUMENTS

| | | | |
|---|---|---|---|
| 6,484,078 B1* | 11/2002 | Kageyama | G08G 1/20 701/25 |
| 10,698,420 B2 | 6/2020 | Sankavaram et al. | |
| 10,968,602 B2 | 4/2021 | Hendricks | |
| 11,061,409 B2 | 7/2021 | Hendricks | |
| 2015/0134184 A1* | 5/2015 | Takeda | G06Q 50/02 701/517 |
| 2018/0088591 A1* | 3/2018 | Friend | G05D 1/0291 |
| 2019/0283765 A1 | 9/2019 | Koti et al. | |
| 2021/0114219 A1* | 4/2021 | Keravala | B25J 9/0084 |
| 2022/0147931 A1 | 5/2022 | Skillsater et al. | |
| 2022/0284748 A1* | 9/2022 | Kithinji | H04W 4/021 |
| 2024/0030863 A1* | 1/2024 | Brulo | F24S 80/00 |

FOREIGN PATENT DOCUMENTS

| | | |
|---|---|---|
| CN | 104820898 B | 8/2015 |
| EP | 3063597 A | 10/2013 |
| WO | 2022100837 A1 | 5/2022 |

OTHER PUBLICATIONS

Kulachenko, et al.. The Variable Neighborhood Search for a Consistent Vehicle Routing Problem under the Shift Length Constraints. (Year: 2019).*
European Extended Search Report for Europe Patent Appln. No. 23192044.8, mailed Feb. 12, 2024 (8 pgs).

* cited by examiner

*Primary Examiner* — Hunter B Lonsberry
*Assistant Examiner* — Henry R Hinton (57) ABSTRACT

A job at a worksite can be performed by machines that deliver material from a loading area to various drop points at the worksite. A computing system can generate machine instructions that cause machines to arrive at the loading area at staggered arrival times that are separated by at least an arrival time separation threshold. The computing system can also adjust the arrival time separation threshold over time, for instance due to changes to durations of time for individual machines to perform operations within the loading area autonomously or based on operator input.

20 Claims, 4 Drawing Sheets

STAGGERING MACHINE ARRIVAL TIMES AT WORKSITE LOADING AREA

TECHNICAL FIELD

The present disclosure relates to management of a fleet of machines at a worksite and, more particularly, to causing machines to arrive at a loading area at staggered times that are spaced apart by at least an arrival time separation threshold.

BACKGROUND

Performance of a job on a worksite can involve machines traveling around the worksite to perform tasks. For example, machines can be loaded with material at a loading area of the worksite, travel to various drop points at the worksite to deliver the material, and then travel back to the loading area to be loaded with additional material.

In some examples, such machines may be autonomous or semi-autonomous machines that can travel and/or perform one or more types of tasks automatically. For instance, such machines may autonomously travel between the loading area and assigned drop points, and/or autonomously perform delivery tasks to deliver material at the assigned drop points.

Various systems have been developed to control travel of vehicles and other machines at a worksite. For example, U.S. Patent Application Pub. No. 2022/0147931 to Skillsater et al. (hereinafter "Skillsater") describes a system for controlling unloading of a vehicle that is transporting a load of unprocessed material from a first location to a second location where the material can be processed. The system described by Skillsater can instruct the vehicle to travel to the second location when an amount of unprocessed material at the second location drops below a threshold. However, the system described by Skillsater is based on travel of a vehicle between two specific locations, and is focused on instructing vehicles based on amounts of material present at the location where the material is to be delivered.

SUMMARY

According to a first aspect, a method includes determining, by a processor, an arrival time separation threshold associated with a plurality of machines at a worksite. A plurality of drop points is located at the worksite. Individual machines, of the plurality of machines, are configured to be loaded with material at a loading area of the worksite and to deliver the material to selected drop points of the plurality of drop points. The arrival time separation threshold indicates a minimum period of time between times at which the individual machines arrive at the loading area. The method also includes determining, by the processor, machine status data associated with the individual machines. The method additionally includes generating, by the processor, and based on the machine status data and the arrival time separation threshold, machine instructions that cause the individual machines to arrive at the loading area at staggered arrival times that are separated by at least the arrival time separation threshold.

According to a second aspect, a computing system includes a processor and a memory. The memory stores computer-executable instructions that, when executed by the processor, cause the processor to determine an arrival time separation threshold associated with a plurality of machines at a worksite. A plurality of drop points is located at the worksite. Individual machines, of the plurality of machines, are configured to be loaded with material at a loading area of the worksite and to deliver the material to selected drop points of the plurality of drop points. The arrival time separation threshold indicates a minimum period of time between times at which the individual machines arrive at the loading area. The computer-executable instructions also cause the processor to determine machine status data associated with the individual machines. The computer-executable instructions additionally cause the processor to generate, based on the machine status data and the arrival time separation threshold, machine instructions that cause the individual machines to arrive at the loading area at staggered arrival times that are separated by at least the arrival time separation threshold.

According to a third aspect, a system includes a plurality of machines at a worksite and a computing system associated with the worksite. A plurality of drop points is located at the worksite. Individual machines, of the plurality of machines, are configured to be loaded with material at a loading area of the worksite and to deliver the material to selected drop points of the plurality of drop points. The computing system is configured to determine an arrival time separation threshold that indicates a minimum period of time between times at which the individual machines arrive at the loading area. The computing system is also configured to receive machine status data associated with the individual machines. The computing system is additionally configured to generate, based on the machine status data and the arrival time separation threshold, machine instructions that cause the individual machines to arrive at the loading area at staggered arrival times that are separated by at least the arrival time separation threshold.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
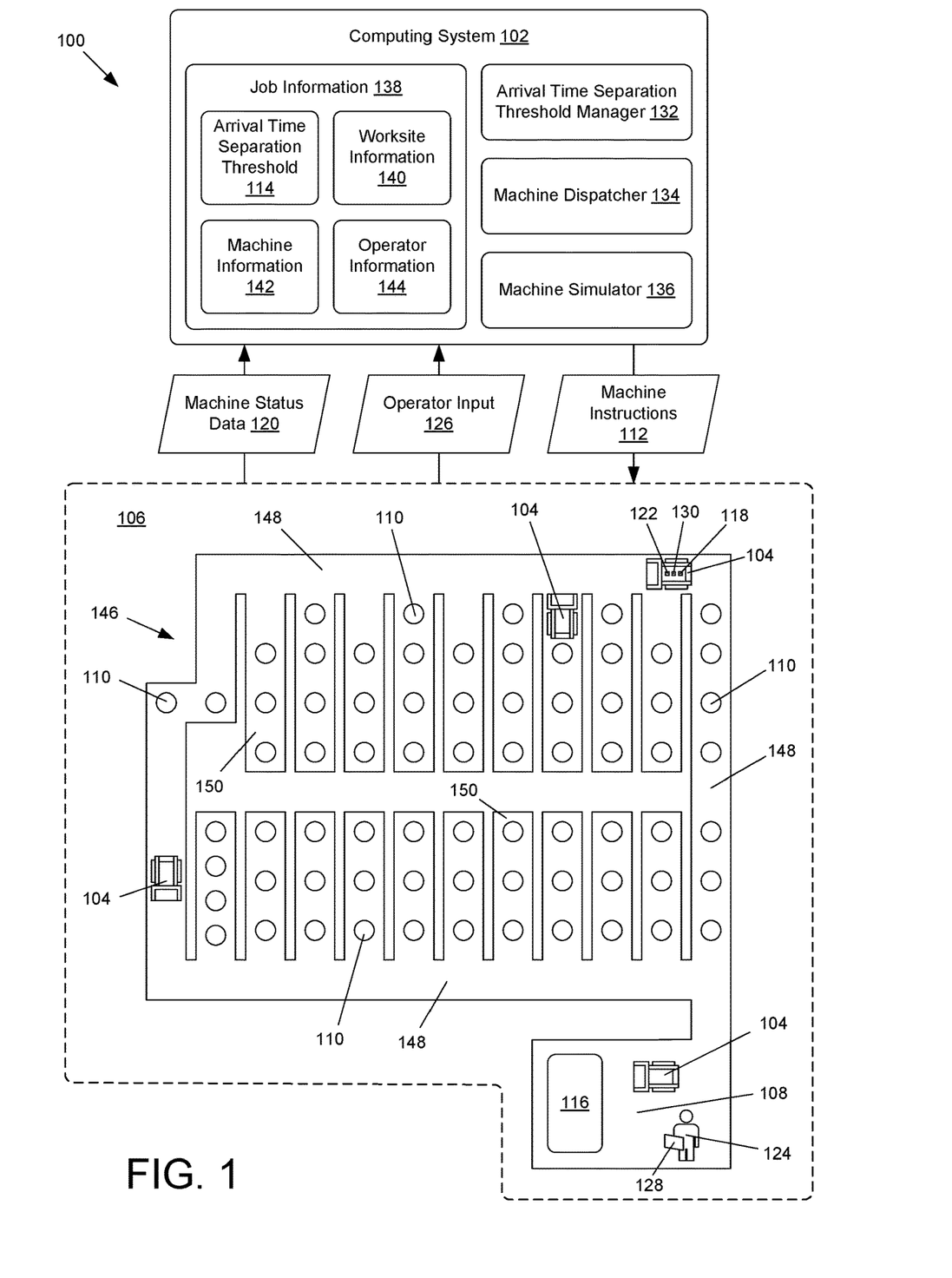
FIG. 1 shows an example of a computing system configured to manage machines at a worksite.

FIG. 1 shows an example 100 of a computing system 102 configured to manage machines 104 at a worksite 106. During a job at the worksite 106, a fleet of machines 104 can be configured to pick up material at a loading area 108, and deliver the material to a set of drop points 110 at the worksite 106. For example, the worksite 106 can be a solar farm that is under construction. In this example, machines 104, such as autonomous or semi-autonomous compact track loaders (CTLs), can pick solar panels, solar panel installation equipment, and/or other material at the loading area 108. The machines 104 can travel to assigned drop points 110 to deliver the material to the drop points 110, and can then return to the loading area 108 to pick up additional material that is to be delivered to other drop points 110.

The computing system 102 can be configured to send machine instructions 112 to individual machines 104 that instruct the machines 104 to autonomously travel between the loading area 108 and assigned drop points 110. As described herein, the computing system 102 can generate the machine instructions 112 to cause different machines 104 to arrive at the loading area 108 at different staggered times that are spaced apart by at least an arrival time separation threshold 114. The arrival time separation threshold 114 can be a minimum period of time between times that different machines 104 arrive at the loading area 108.

As an example, if the arrival time separation threshold 114 is set to be one minute, the computing system 102 can generate machine instructions 112 for different machines 104 that cause the different machines 104 to arrive at the loading area 108 at least one minute apart from each other. For instance, if a first machine is instructed to arrive at the loading area 108 at a first time, and a second machine is instructed to arrive at the loading area 108 at a second time that is at least one minute later than the first time, the first machine can complete operations at the loading area 108 and depart the loading area 108 before the second machine arrives at the loading area at the second time. Accordingly, the machine instructions 112 generated by the computing system 102 as described herein can cause the machines 104 to arrive at the loading area 108 at staggered arrival times.

The worksite 106 can be a construction site, a mine site, a quarry, or any other type of worksite or work environment at which material can be delivered to defined drop points 110. The machines 104 at the worksite 106 can be CTLs, skid steer loaders, track loaders, haul trucks, wheel loaders, or any other type of machine that can transport material from one location to another at the worksite 106. The material can be solar panels, solar panel installation equipment, construction materials, dirt, gravel, and/or any other type of material that is to be delivered to the drop points 110 at the worksite 106.

As an example, as discussed above, the worksite 106 can be a solar farm construction site. At a solar farm, support elements, such as H-beams, pedestals, posts, or other elements can be installed to extend substantially vertically from a ground surface of the worksite 106. Torque tubes or other elements can also be installed to extend substantially horizontally from and/or between the tops of the H-beams or other support elements, such that the torque tubes or other elements are raised above the ground surface of the worksite 106. A series of solar panels can also be mounted along the torque tubes or other horizontal elements. Accordingly, in these examples, CTLs and/or other machines 104 can transport solar panels and/or solar panel installation equipment, such as torque tubes, H-beams, and/or other elements, from the loading area 108 to drop points 110 located at or near locations at the worksite 106 where such solar panels and/or solar panel installation equipment are to be installed.

The material can be picked up by machines 104, and/or be loaded onto machines 104, from a material source 116 at the loading area 108. In some examples, the material source 116 can be a group of units of material that have been delivered to the loading area 108 by one or more haul trucks, flatbed trucks, or other vehicles, or that is still on-board such vehicles within the loading area 108. For instance, the material source 116 can be a set of pallets of solar panels that have been delivered to the loading area 108, or that is still on a flatbed truck. In other examples, the material source 116 can be a pile or other grouping of gravel, dirt, or other material that was found at the loading area 108, or that has been separately delivered to the loading area 108.

The machines 104 can be vehicles or other mobile machines that have engines, motors, drivetrains, braking systems, hydraulic components, and/or other mechanisms that can cause movement of wheels of the machines 104, movement of work tools and/or other elements of the machines 104, and/or otherwise implement operations of the machines 104. In some examples, one or more of the machines 104 can be fuel-powered machines that operate based on power provided by internal combustion engines and/or other elements that consume fuel. In other examples, one or more of the machines 104 can be battery electric machines (BEMs), battery electric vehicles (BEVs), hybrid vehicles, fuel cell and battery hybrid vehicles, or other mobile machines. For instance, the machines 104 can have batteries, such as lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries that can at least partially power the machines 104.

The machines 104 can be semi-autonomous machines or fully autonomous machines that operate automatically based at least in part on the machine instructions 112 generated by the computing system 102. For example, a machine can have an electronic control module (ECM) 118 and/or other on-board computing devices that can fully or partially control operations of the machine, such as steering, speed adjustments, work tool movements, and/or other operations. Accordingly, operations of a machine can be fully or partially controlled, automatically or semi-automatically, by on-board controllers such as the ECM 118, and/or off-board controllers such as the computing system 102. A machine can, for instance, have an on-board guidance system that can drive the machine autonomously, an obstacle detection system that assists the on-board guidance system or can alert a human operator of nearby objects detected by the obstacle detection system, and/or other systems that fully or partially control operations of the machine. As another example, the computing system 102 or another off-board computing device can receive machine status data 120 from a machine and return machine instructions 112 to the machine to dispatch the machine to autonomously travel along a defined and/or assigned route, or to fully or partially control operations of the machine remotely, as described further below.

The machines 104 can also include sensors 122, such as cameras, LIDAR sensors, RADAR sensors, other optical sensors or perception systems, Global Positioning System (GPS) sensors, other location and/or positioning sensors, work tool position sensors, hydraulic pressure sensors, payload sensors, speed sensors, brake temperature sensors, other temperature sensors, tire pressure sensors, battery state of health (SoH) sensors, fuel sensors, incline and decline travel sensors, and/or other types of sensors. Such sensors 122 of a machine can be operable coupled to the ECM 118 and/or other on-board computing systems of the machine. The sensors 122 can also provide corresponding sensor data to the ECM 118 and/or other on-board computing systems of the machine, and/or via machine status data 120 to off-board computing systems such as the computing system 102, such that the sensor data can be used to determine a location of the machine, detect nearby terrain, detect nearby objects, such as vehicles, other machines, or personnel, detect the positions of such nearby objects relative to the machine, determine a weight of a payload carried by the machine, determine a state of charge (SoC) of a battery system, determine an amount of fuel carried by the machine, and/or perform other operations. In some examples, data provided by sensors 122 of a machine can enable the ECM 118 of the machine to cause the machine to drive and/or operate autonomously or semi-autonomously.

The machine status data 120 associated with a machine, which the ECM 118 of the machine may report to the computing system 102 and/or other elements as described herein, can indicate a location of the machine at the worksite 106, for instance based on GPS coordinates or other positioning data determined by one of more location sensors of the machine. The machine status data 120 can also include, or be based on, sensor data determined by sensors 122 of the machine, such as current and/or historical travel speeds, work tool positions, hydraulic pressures, fuel levels, battery SoC levels, and/or other types of sensor data. In some examples, the machine status data 120 can also indicate time and/or progress information associated with an assigned instance of a task, such as an estimated task completion percentage and/or an estimated time remaining to complete a task associated with travel to and/or from an assigned drop point and/or operations at the assigned drop point. The machine status data 120 can, for example, indicate times when the machines 104 arrive at, and/or depart the loading area 108, information about operations performed by the machines 104 while the machines 104 are within the loading area 108, and/or other information As discussed above, the machines 104 can operate autonomously or semi-autonomously based on machine instructions 112. For example, the machine instructions 112 can indicate which drop points 110 are assigned to individual machines 104, outbound routes the machines 104 are to use to travel from the loading area 108 to assigned drop points 110, inbound routes the machines 104 are to use to travel from drop points 110 back to the loading area 108, travel speeds the machines 104 are to travel at during one or more portions of inbound routes and/or outbound routes, when and/or where machines 104 are to park and/or idle at the worksite 106, which operations the machines 104 are to perform at the loading area 108, assigned drop points 110, or other locations at the worksite 106, and/or any other types of instructions.

In some examples, the machines 104 can also follow machine instructions 112 to automatically pick up material from the material source 116 at the loading area 108. However, in other examples, the machines 104 can be semi-autonomous, and can be operated at least in part by a human operator 124 while at the loading area 108. In these examples, the machines 104 may drive autonomously or semi-autonomously at most areas of the worksite 106, for instance while driving along routes to or from drop points 110. However, when the machines 104 are at the loading area 108, the human operator 124 may take at least partial control of the machines 104. Accordingly, the human operator 124 can manually direct at least some operations of individual machines 104 to pick up or load material from the material source 116 in the loading area 108. After being loaded with material from the material source 116 in the loading area 108 based on operator input 126 provided by the human operator 124, the machines 104 can autonomously or semi-autonomously travel from the loading area 108 to deliver the material to assigned drop points 110.

In some examples, the human operator 124 may board individual machines 104 after the machines 104 arrive at the loading area 108. For instance, the human operator 124 can use steering wheels, levers, and/or other in-cab or on-board controls of the machines 104 to provide operator input 126 and at least partly control operations of individual machines 104 during loading of material from the material source 116 onto the machines 104.

In other examples, the human operator 124 can use a user device 128 to provide operator input 126 and remotely control at least some operations of the machines 104 within the loading area 108. The user device 128 can wirelessly interface with ECMs and/or other on-board controllers of the machines 104, such that the human operator 124 can remotely control movements and/or other operations of the machines 104 via the user device 128 while the machines 104. For instance, the human operator 124 can use the user device 128 to provide operator input 126 and at least partly control operations of individual machines 104 during loading of material from the material source 116 onto the machines 104.

The user device 128 can, for example, be a handheld device with one or more joysticks, buttons, and/or other control mechanisms. The user device 128 can also, in some examples, have a screen that can display video and/or images provided by cameras on the machines 104, sensor data provided by other types of sensors 122 on the machines 104, and/or any other types of information. Such a screen of the user device 128 may, in some examples, be a touch screen, such that the human operator 124 can provide operator input 126 to control the machines 104 via the touch screen instead of, or in addition to, joysticks or other control mechanisms.

In some examples, the user device 128 can be the computing system 102 described herein. For instance, the user device 128 can be a handheld computing device that can receive machine status data 120 associated one or more machines 104, and can generate and send corresponding machine instructions 112 as described herein that cause individual machines 104 to travel and/or perform other operations autonomously or semi-autonomously. Accordingly, the user device 128 can manage the fleet of machines 104 at the worksite 106 based on the machine status data 120, by assigning individual machines 104 to travel to particular drop points 110, instructing machines 104 to use particular routes, controlling travel speeds of the machines 104, and/or directing other operations of the machines 104 as described herein. In these examples, the user device 128 can also receive operator input 126 from the human operator 124 and provide corresponding machine instructions 112 to machines 104 located within the loading area 108, such that the human operator 124 can remotely control the machines 104 within the loading area 108 via the user device 128.

Figure 4:
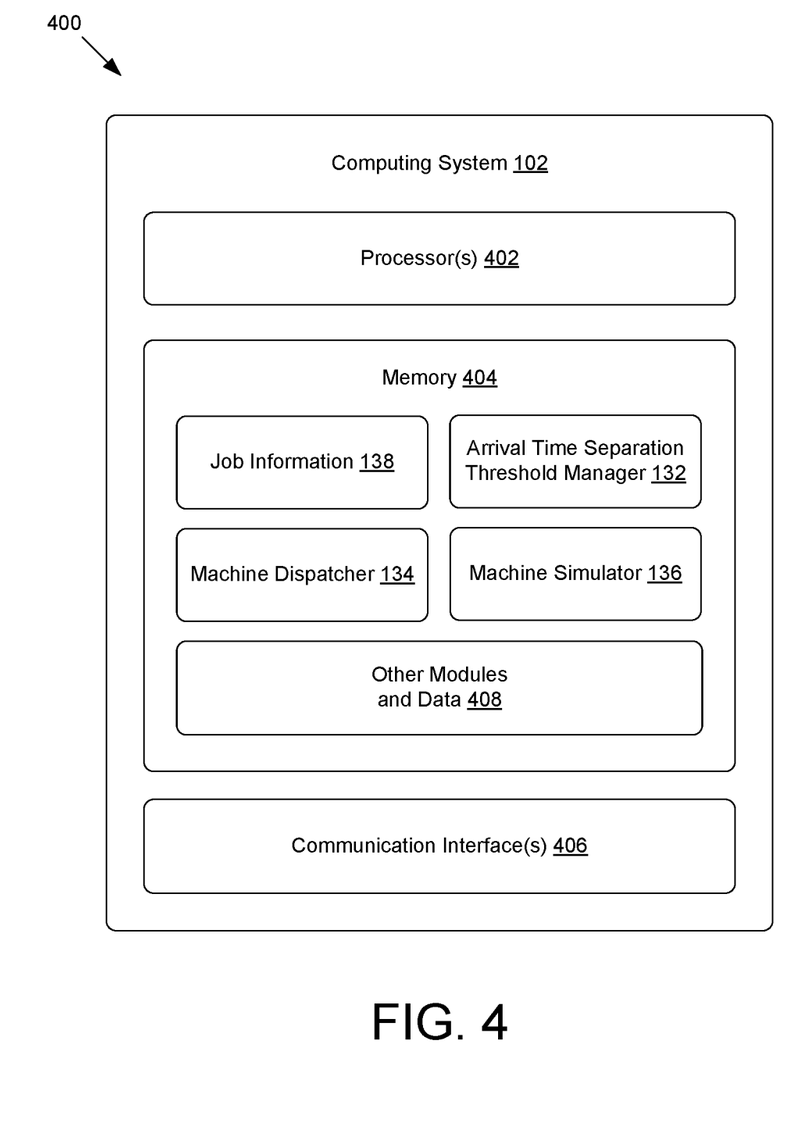
FIG. 4 shows an example system architecture for the computing system.

However, while the user device 128 can be the computing system 102 in some examples, in other examples the computing system 102 can be separate from the user device 128. For instance, the computing system 102 can be one or more servers, computers, or other off-board computing devices that are separate from the machines 104 and the user device 128. In these examples, the computing system 102 can be located on-site at the worksite 106, or may be located at a back office or other location that is remote from the worksite 106. FIG. 4, discussed further below, shows an example system architecture for the computing system 102 and/or the user device 128.

In examples in which the computing system 102 is separate from the user device 128, the computing system 102 can receive machine status data 120 associated one or more machines 104, and can generate and send corresponding machine instructions 112 as described herein that cause individual machines 104 to travel and/or perform other operations autonomously or semi-autonomously. The computing system 102 can also receive copies or summaries of operator input 126 provided by the human operator 124 via the user device 128 or on-board controls of the machines 104. As an example, the user device 128 can wirelessly transmit copies or summaries of operator input 126, provided by the human operator 124 to the user device 128 while the human operator 124 manually controls individual machines 104 within the loading area 108 via the user device 128, to the computing system 102. As another example, if the human operator 124 manually controls a machine via in-cab controls of the machine while the machine is at the loading area 108, corresponding machine status data 120 associated with that machine that is sent to the computing system 102 can indicate operator input 126 provided via the in-cab controls of the machine.

The machines 104 can have wireless communication interfaces 130 that are operably coupled to the ECMs of the machines 104, and that allow the ECMs of the machines 104 to exchange data with the computing system 102, the user device 128, other off-board controllers, ECMs of other machines 104, and/or other computing devices. For example, the wireless communication interfaces 130 of the machines 104 can be used to transmit machine status data 120 to the computing system 102, ECMs of other machines, and/or the user device 128, to receive machine status data 120 from ECMs of other machines 104, and/or to receive machine instructions 112 from the computing system 102 and/or the user device 128.

The wireless communication interfaces 130 can be, or include, cellular interfaces, modems, receivers, transmitters, antennas, and/or other hardware or software elements configured to send and receive data. The computing system 102, the user device 128, and/or other off-board controllers can have, or be associated with, the same or similar types of wireless communication interfaces 130, such that the computing system 102, the user device 128, and/or other off-board controllers can wirelessly exchange data with the ECMs and/or other on-board computing systems of the machines 104.

In some examples, the wireless communication interfaces 130 can be used to create and/or maintain a wireless mesh network at the worksite 106 via machine-to-machine (M2M) communications and/or wireless communications with the computing system 102 and/or user device 128. For instance, if the worksite 106 is in a remote geographic area that does not have cellular data service, the computing system 102, the user device 128, and/or ECMs of individual machines 104 can communicate via a local wireless mesh network established at the worksite 106. As an example, if the computing system 102 is sending machine instructions 112 associated with a particular machine, but that particular machine is located relatively far away from the computing system 102, the machine instructions 112 can be relayed through wireless communication interfaces 130 of one or more other machines 104 so that the machine instructions 112 can be delivered to the wireless communication interfaces 130 of the particular machine via the mesh network. In other examples, the computing system 102, the user device 128, and/or ECMs of individual machines 104 can communicate wirelessly via a cellular data network, Wi-Fi® network, or any other type of network.

As discussed above, individual machines 104 can arrive at the loading area 108 and can perform operations automatically, and/or based on operator input 126 provided by the human operator 124, to be loaded with material from the material source 116. The computing system 102 can generate machine instructions 112 for one or more of the machines 104 that cause the machines 104 to arrive at the loading area 108 at staggered times that are separated by at least the arrival time separation threshold 114.

For example, the computing system 102 can have an arrival time separation threshold manager 132 that can determine and/or adjust the arrival time separation threshold 114. The computing system 102 can also have a machine dispatcher 134 that generates machine instructions 112 that cause the machines 104 to arrive at the loading area 108 at staggered times that are separated by at least the arrival time separation threshold 114 determined by the arrival time separation threshold manager 132. In some examples, the machine dispatcher 134 can generate the machine instructions 112 based at least in part on simulations of machines 104 performed by a machine simulator 136 of the computing system 102.

Operations of the arrival time separation threshold manager 132, the machine dispatcher 134, and/or the machine simulator 136 can be based on machine status data 120, operator input 126, and/or job information 138 associated with a job being performed at the worksite 106. The job information 138 can include data provided to the computing system 102 and/or determined by the computing system 102. The job information 138 can include the arrival time separation threshold 114, worksite information 140, machine information 142, and/or operator information 144.

The worksite information 140 can indicate attributes of the worksite 106. For example, the worksite information 140 can include a site map, a route graph, and/or other data indicating a location of the loading area 108, locations of the drop points 110, and/or locations of paths 146 at the worksite 106 that are traversable by machines 104. The worksite information 140 can also indicate boundaries of the worksite 106, terrain types and/or grades at the worksite 106, locations and/or identities of obstacles at the worksite 106, current and/or forecasted weather conditions associated with the worksite 106, and/or other information associated with the worksite 106. For instance, the worksite information 140 may indicate which drop points 110 material has already been delivered to, locations and/or positions of structures that have already been installed at the worksite 106, and/or other types of information. The worksite information 140 can indicate positions of drop points 110 and other elements based on GPS coordinates, relative coordinates, and/or any other location or positioning system.

The paths 146 can be roads, passable routes, and/or other pathways through the worksite 106. For example, the paths 146 can extend from the loading area 108 to and/or through individual drop points 110, such that machines 104 can navigate one or more of the paths 146 to deliver material from the loading area 108 to assigned drop points 110. The drop points 110 can be located on or near the paths 146. In some examples, the paths 146 can include main paths 148 and/or dead-end paths 150, as shown in FIG. 1. The dead-end paths 150 may branch off from the main paths 148. In some examples, the machines 104 may be configured to, or be instructed to, deliver material to drop points 110 closest to the ends of dead-end paths 150 first. This may avoid material being delivered to a drop point that is nearest to an entry into a dead-end path first, which might otherwise block access to drop points 110 closer to the ends of the dead-end paths 150. In some examples in which some or all of the paths 146 are not wide enough for multiple machines 104 to pass side-by-side on the paths 146, a machine may wait, or be instructed to wait, within a dead-end path that branches from a main path until another machines that is traveling along the main path passes the branching dead-end path. In other situations, machines 104 may also wait, or be instructed to wait, at intersections between paths 146, at main paths 148, at dead-end paths 150, and/or at other locations at the worksite 106.

The worksite information 140 can include, or be based on, a route graph with nodes that represent the loading area 108 and the drop points 110, and edges between the nodes that represent the paths 146. The route graph and/or a corresponding site map can also indicate other worksite information 140, such as the number of drop points 110, how much material is to be delivered to each drop point, which nodes of the route graph are drop points 110 and which node is the loading area 108, which edges between nodes of the route graph can be traversed to build a route for a machine from one node to another node via the paths 146, and/or other information about the worksite 106 or the job. The worksite information 140 can also include speed limits associated with one or more paths 146, path capacity values indicating maximum numbers of machines 104 that can traverse points along the paths 146 at the same time, and/or other information.

In some examples, the computing system 102 may generate and/or derive some or all of the worksite information 140 based on a design file and/or other information associated with the worksite 106. For example, a design file can be a computer-aided design (CAD) file that shows locations where solar panels and/or other solar farm equipment, such as H-beams or torque tubes, are to be installed at the worksite 106, and the computing system 102 may use such a design file to determine locations of drop points 110 where such solar panels and/or other solar farm installation equipment can be delivered for later installation. In other examples, a design file may directly define locations of drop points 110. In other examples, a design file may indicate installed locations for solar panels and/or other solar farm installation equipment, and the computing system 102 can use that information to determine locations of nearby drop points 110 where solar panels and/or other solar farm installation equipment can be delivered so that the solar panels and/or other solar farm installation equipment can then be installed at the locations defined by the design file.

The machine information 142 can be data associated with the machines 104 and/or operations of the machines 104 at the worksite 106. In some examples, the machine information 142 can be based on, and/or dynamically updated, based on machine status data 120 received by the computing system 102, based on machine simulations performed by the machine simulator 136, based on operator input 126, and/or based on machine instructions 112 associated with machines 104. Some of the machine status data 120 can also, or alternately, be based on historical information and/or predetermined information about machines 104.

The machine information 142 can indicate how many machines are in operation at the worksite 106, which drop points 110 individual machines 104 have been assigned to deliver material to, real-time locations of the machines 104 based on machine status data 120, real-time speeds of the of the machines 104 based on machine status data 120, fuel and/or battery levels of machines 104 based on machine status data 120, whether machines 104 are or are not loaded with material, and/or other types of information.

In some examples, the machine information 142 can also, or alternately, indicate other attributes of machines 104, such as maximum speeds of the machines 104, maximum amounts of material the machines 104 can transport, and/or other information. Such attributes may, in some examples, be determined by the computing system 102 based on historical machine status data 120. As an example, based on historical machine status data 120, the machine information 142 may indicate that each machine travels five miles per hour on average.

The machine information 142 can also, in some examples, indicate loading times and/or unloading times for each machine. As an example, based on machine status data 120, historical information, or other data sources, the machine information may indicate that on average each machine will take 35 seconds to autonomously load material at the loading area 108, and 20 seconds to autonomously unload that material at a drop point.

In some examples, machine speeds, travel times, loading times, unloading times, and/or other machine information 142 can be estimated based on simulations performed by the machine simulator 136 using a physics-based model of the machines 104 and/or the worksite 106. For example, the machine simulator 136 may simulate operations of a particular machine during travel through a potential route from the loading area 108 to a particular drop point, based on incline angles and/or other terrain information associated with the potential route, soil densities or other work surface conditions of the worksite 106, current or forecasted weather conditions, the weight of a load that would be carried by the machine from the loading area 108 to the drop point, and/or other factors. Such physics-based simulations can indicate speeds at which the machine would travel during individual portions of the overall route, how long the machine would take to drop off material at a drop point associated with the route, and/or other information. Accordingly, rather than machine speeds, operation performance times, and/or other types of machine information 142 being determined based on historical averages or other data, such values can be determined for specific possible routes to drop points 110 for machines 104 based on simulations performed by the machine simulator 136.

The operator information 144 can, in examples in which the machines 104 are controlled at least in part by the human operator 124 at the loading area 108, indicate information about the human operator 124. For example, the operator information 144 can include an operator profile that identifies the human operator 124, a work schedule of the human operator 124, an experience level of the human operator 124, and/or other information about the human operator 124. The operator information 144 can include such operator profiles for multiple human operators, such that the computing system 102 can use an operator profile associated with the human operator 124 that is on-duty at the loading area 108, for instance by switching to using a different operator profile if a different human operator takes over at the loading area 108. In some examples, the operator information 144 can also, or alternately, include operator input 126 and/or summaries of operator input 126 used by the human operator 124 to control machines 104 at the loading area 108.

The operator information 144 can indicate how long it takes for the human operator 124 to control individual machines 104 within the loading area 108. For instance, machine status data 120 and/or operator input 126 can indicate types, times, and/or durations of operations the machines 104 perform within the loading area 108 based on operator input 126 provided by the human operator 124. Accordingly, corresponding operator information 144 can indicate how long it takes for the human operator 124 to at least partially control operations of the machines 104 to pick up material from the material source 116 at the loading area 108 as described above.

As an example, the operator information 144 can indicate how long on average it has taken for the human operator 124 to control individual machines 104 within the loading area 108 over a period of time, and/or at different times of a day or a work shift. For instance, the operator information 144 may indicate that the human operator 124 takes 45 seconds to control each machine on average during most portions of a work shift, but slows down to taking 55 seconds to control each machine on average when the human operator 124 is within an hour of a lunch break.

As another example, the operator information 144 can indicate trends of how such operation control times associated with the human operator 124 have changed over time. For instance, if the human operator 124 has a low amount of experience, the operator information 144 may indicate that the human operator 124 is taking a relatively long time to control each machine within the loading area 108. However, as the human operator 124 gains experience, the human operator 124 may progressively take less time to control each machine within the loading area 108, and the operator information 144 can indicate a corresponding trend of lower and lower operation control times. Similarly, based on operator input 126 received in real-time, the operator information 144 may indicate that the human operator 124 has stopped or is currently slowing down operations of machines 104 at the loading area 108, potentially due to unexpected complications with one or more machines 104, a bathroom break, or for any other reason.

As discussed above, the arrival time separation threshold manager 132 of the computing system 102 can determine and/or adjust the arrival time separation threshold 114. In some examples, the arrival time separation threshold manager 132 can set the arrival time separation threshold 114 to a predetermined value. For instance, the arrival time separation threshold manager 132 can set the to a period of one minute, or any other predetermined value. The predetermined value can, in some examples, be based on an operator profile of the human operator 124, such as a value that is based on an experience and/or expertise level of the human operator 124. As an example, if the human operator 124 is a novice, the arrival time separation threshold manager 132 may be set to a predetermined value of ninety seconds. However, if the human operator 124 is an expert, the arrival time separation threshold manager 132 may be set to a predetermined value of sixty seconds.

In other examples, the arrival time separation threshold manager 132 can dynamically adjust the arrival time separation threshold 114 over time. For example, the arrival time separation threshold manager 132 can adjust the arrival time separation threshold 114 based on machine status data 120 associated with one or more machines 104, operator input 126, one or more types of job information 138, simulations performed by the machine simulator 136, and/or any other data.

As an example, if the arrival time separation threshold 114 is set to 60 seconds, but the operator input 126 indicates that the human operator 124 is currently taking an average of 80 seconds to manually control each machine within the loading area 108, the arrival time separation threshold manager 132 may dynamically adjust the value of the arrival time separation threshold 114 from 60 seconds to 80 seconds or above. Accordingly, by adjusting the arrival time separation threshold 114 to at least 80 seconds, the human operator 124 can be more likely to complete operations of one machine within the loading area 108 before the next machine arrives at the loading area 108.

As another example, if the arrival time separation threshold 114 is set to 60 seconds, but the operator input 126 indicates that the human operator 124 is currently taking an average of 45 seconds to manually control each machine within the loading area 108, the arrival time separation threshold manager 132 may dynamically lower the value of the arrival time separation threshold 114 from 60 seconds to 45 seconds or above. Accordingly, by lowering the arrival time separation threshold 114 to a smaller value based on the operator input 126 indicating that the human operator 124 is able to work more quickly than the current value of the arrival time separation threshold 114, machines 104 can arrive more frequently to the loading area 108 and operations may be able to be completed more quickly at the worksite 106 overall.

In some examples, the arrival time separation threshold manager 132 can be configured to set the value of the arrival time separation threshold 114 to a value that is at least a buffer value above the average amount of time the human operator 124 takes to control each machine within the loading area 108, or to a value that is equal to or greater than a maximum amount of time the human operator 124 has taken to control a machine within the loading area 108 during a preceding time period. As an example, if the human operator 124 takes 65 seconds on average to control operations of the machines 104 in the loading area 108, and the buffer value is set to 10 seconds, the arrival time separation threshold manager 132 may set the arrival time separation threshold 114 to 75 seconds. As another example, if the human operator 126 has taken 65 seconds on average to control operations of the machines 104 in the loading area 108 during the past hour, but the operation control times during the past hour have varied between 50 seconds and 80 seconds, the arrival time separation threshold manager 132 may set the arrival time separation threshold 114 to at least 80 seconds.

While the human operator 124 may at least partially control operations of machines 104 within the loading area 108 as described above, in other examples the machines 104 can be fully autonomous and automatically perform operations to load material within the loading area 108. Accordingly, in these examples, the arrival time separation threshold manager 132 may determine or adjust the arrival time separation threshold 114 based on machine status data 120, machine simulations, and/or other data indicating how long individual machines 104 have taken, or are projected to take, to perform operations within the loading area 108.

As an example, if the arrival time separation threshold 114 is set to 60 seconds, but the machine status data 120 indicates that machines 104 are currently taking an average of 50 seconds to autonomously perform operations within the loading area 108, the arrival time separation threshold manager 132 may dynamically lower the value of the arrival time separation threshold 114 from 60 seconds to 50 seconds or above. Accordingly, by lowering the arrival time separation threshold 114 to a smaller value based on the machine status data 120 indicating that the machines 104 are able to work more quickly than the current value of the arrival time separation threshold 114, machines 104 can arrive more frequently to the loading area 108 and operations may be able to be completed more quickly at the worksite 106 overall.

As another example, if the arrival time separation threshold 114 is set to 60 seconds, but simulations of machines 104 by the machine simulator 136 based on current weather forecasts indicate that machines 104 are likely to take ten seconds longer to perform operations within the loading area 108 during an upcoming forecasted storm, the arrival time separation threshold manager 132 may dynamically adjust the value of the arrival time separation threshold 114 from 60 seconds to 70 seconds or above. Accordingly, by adjusting the arrival time separation threshold 114 to at least 70 seconds, each machine can be more likely to complete operations within the loading area 108 during the storm before the next machine arrives at the loading area 108.

The arrival time separation threshold 114 that is set and/or adjusted by the arrival time separation threshold manager 132 can accordingly indicate a minimum period of time between times at which machines 104 arrive at the loading area 108. The machine dispatcher 134 can generate machine instructions 112 that cause machines 104 to arrive at the loading area 108 at staggered arrival times that are no more frequent than the arrival time separation threshold 114. Two machines 104 can therefore arrive at the loading area 108 at different times that are separated by the arrival time separation threshold 114, or by more than the arrival time separation threshold 114. As an example, if the arrival time separation threshold 114 is set to be 60 seconds, the machine dispatcher 134 can generate machine instructions 112 that cause a first machine to arrive at the loading area 108 at a first time, a second machine to arrive at the loading area 108 at a second time that is at least 60 seconds after the first time, and the first machine or a third machine to arrive at the loading area 108 at a third time that is at least 60 seconds after the second time.

The machine dispatcher 134 can control arrival times of the machines 104 at the loading area 108, and cause such arrival times to vary by at least the arrival time separation threshold 114, based on the machine instructions 112 that the machine dispatcher 134 generates in association with individual machines 104. The machine dispatcher 134 can generate the machine instructions 112 to control which drop points 110 individual machines 104 travel to, when individual machines 104 travel to drop points 110, which routes individual machines 104 use to travel to and/or from drop points 110, speeds at which individual machines 104 travel, when and/or where individual machines 104 park or idle at the worksite 106, how many machines 104 are operating at the worksite 106, and/or other attributes of operations of machines 104 at the worksite 106.

As an example, the machine dispatcher 134 can select drop points 110 for individual machines 104 and issue corresponding machine instructions 112, such that the machines 104 travel from the loading area 108 to the selected drop points 110 and then return to the loading area 108 at arrival times that are separated by at least the arrival time separation threshold 114. For example, the machine dispatcher 134 can instruct a first machine to deliver material to a first drop point that is relatively far from the loading area 108, and also instruct a second machine to deliver material to a second drop point that is closer to the loading area 108 than the first drop point. Accordingly, the second machine may be able to travel to the second drop point and return to the loading area 108 to pick up additional material before the first machine returns to the loading area 108, such that the second machine and the first machine arrive back at the loading area 108 at staggered arrival times that are separated by at least the arrival time separation threshold 114.

As another example, the machine dispatcher 134 can control speeds of the machines 104, to cause the machines 104 to arrive at the loading area 108 at arrival times that are separated by at least the arrival time separation threshold 114. For example, if machine status data 120 indicates current locations and current travel speeds of a first machine and a second machine, and the machine status data 120 indicates that the first machine and the second machine are likely to arrive at the loading area 108 at times that are less than the arrival time separation threshold 114 apart, the machine dispatcher 134 can generate new machine instructions 112 that adjust the speeds of one or both of the first machine or the second machine. For instance, the new machine instructions 112 may cause the first machine to speed up, and/or the second machine to slow down, such that changes in travel speeds are projected to cause the first machine and the second machine to arrive at the loading area 108 at staggered arrival times that are separated by at least the arrival time separation threshold 114. Similarly, the new machine instructions 112 may cause one or both of the first machine or the second machine to take alternate routes, to stop at least temporarily, and/or to perform other operations that lead to the first machine and the second machine arriving the loading area 108 at staggered arrival times that are separated by at least the arrival time separation threshold 114.

In some examples, the machine instructions 112 can be based on simulations of the machines 104 by the machine simulator 136. For example, the machine dispatcher 134 can generate candidate machine instructions for a particular machine, and have the machine simulator 136 simulate operations of the particular machine based on the candidate machine instructions, for instance to determine how long the particular machine would be projected to take to travel to a candidate drop point from the loading area 108, perform drop-off operations at the candidate drop point, and return to the loading area 108. Based on such simulations, the machine dispatcher 134 can use the candidate machine instructions as the machine instructions 112 associated with the particular machine, or adjust the candidate machine instructions or use different candidate machine instructions as the machine instructions 112 associated with the particular machine.

As an example, if simulations performed by the machine simulator 136 based on first candidate machine instructions indicate that a first machine would travel from the loading area 108 to a first drop point and then return to the loading area 108 at a time that is less than the arrival time separation threshold 114 after another machine arrived at the loading area, the machine dispatcher 134 may determine not to use the first candidate machine instructions for the first machine. The machine dispatcher 134 may instead generate second candidate machine instructions that would cause the first machine to travel to a second drop point that is farther away from the loading area than the first drop point, thereby extending the round-trip travel time of the first machine. If simulations performed by the machine simulator 136 based on the second candidate machine instructions indicate that the first machine would travel from the loading area 108 to the second drop point and then return to the loading area 108 at a time that is at or after the arrival time separation threshold 114 after another machine arrived at the loading area, the machine dispatcher 134 may determine to use the second candidate machine instructions for the first machine.

In some examples, the machine dispatcher 134 can generate the machine instructions 112 to control the number of machines 104 operating on the worksite 106. For example, if eight machines 104 are currently operating at the worksite 106, the machine dispatcher 134 and/or the machine simulator 136 may determine that, for machines 104 to arrive at the loading area 108 at staggered arrival times separated by at least the arrival time separation threshold 114, one machine would routinely have to park and idle outside the loading area 108 while waiting for another machine to depart the loading area 108. The machine dispatcher 134 and/or the machine simulator 136 may also determine that a fleet of seven machines 104 could operate at the worksite 106 and arrive at staggered arrival times separated by at least the arrival time separation threshold 114 without any of the machines 104 having to idle while waiting for other machines 104 within the loading area 108. Accordingly, the machine dispatcher 134 may issue machine instructions 112 to lower the number of machines 104 operating on the worksite 106 from eight to seven, for instance by instructing one of the eight machines 104 to return to a parking area and cease operations at the worksite 106.

As another example, the machine dispatcher 134 and/or the machine simulator 136 may determine that machines 104 are arriving at the loading area 108 less frequently than the arrival time separation threshold 114. The machine dispatcher 134 and/or the machine simulator 136 may also determine that a higher number of machines 104 could operate at the worksite 106 without the machines 104 arriving at the worksite 106 more frequently than the arrival time separation threshold 114. Accordingly, the machine dispatcher 134 may issue machine instructions 112 to increase the number of machines 104 operating on the worksite 106, for instance by instructing one or more parked machines to travel to the worksite 106 and to begin operations at the worksite 106.

In some examples, the machine dispatcher 134 can issue machine instructions 112 to decrease or increase the number of machines 104 operating at the worksite 106 as discussed above, for instance by sending machine instructions 112 to machines 104 to cause the machines 104 to autonomously travel to or from a parking area. In other examples, the machine dispatcher 134 can send the machine instructions 112, or corresponding notifications, to another element or entity that has control over the number of machines operating at the worksite 106. For instance, if the number of machines 104 operating at the worksite 106 is controlled by a separate worksite-level server, or is controlled by a human worksite manager, the machine dispatcher 134 can send a recommendation to decrease or increase the number of machines to the worksite-level server or to a computing device used by the human worksite manager, such that the worksite-level server or human worksite manager can take action to adjust the number of machines 104 operating at the worksite 106.

The machine dispatcher 134 can also, in some examples, be configured to avoid adjusting, or recommending adjusting, the number of machines 104 operating at the worksite 106 too frequently, or to above or below threshold numbers of machines 104. As an example, the machine dispatcher 134 can be configured to avoid decreasing the number of machines 104 operating at the worksite 106 to below a minimum number of machines 104, such that at least the minimum number of machines 104 remain operating at the worksite 106. As another example, the machine dispatcher 134 can be configured to avoid decreasing the number of machines 104 more than once an hour, or to avoid decreasing the number of machines 104 more frequently than another threshold frequency. Accordingly, in this example, the machine dispatcher 134 can prioritize selecting drop points 110, controlling speeds of machines 104, and/or taking other actions to cause machines 104 to arrive at the loading area 108 at staggered arrival times that are separated by at least the arrival time separation threshold 114, instead of taking machines 104 offline more frequently than the threshold frequency to enforce arrivals of machines 104 at the loading area 108 based on the arrival time separation threshold 114.

Overall, the computing system 102 can generate machine instructions 112 that cause machines 104 to arrive at the loading area 108 at staggered arrival times that are separated by at least the arrival time separation threshold 114, for instance by selecting drop points 110 to assign to individual machines 104 and/or by controlling or adjusting operations of individual machines 104. The computing system 102 can also adjust the arrival time separation threshold 114 based on machine status data 120 and/or operator input 126, for instance to increase or decrease the arrival time separation threshold 114 based on changes in how long the human operator 124 and/or the machines 104 are taking to perform operations at the loading area 108. Processes for adjusting the arrival time separation threshold 114 and for generating machine instructions 112 based on the arrival time separation threshold 114 are discussed further below with respect to FIG. 2 and FIG. 3.

Figure 2:
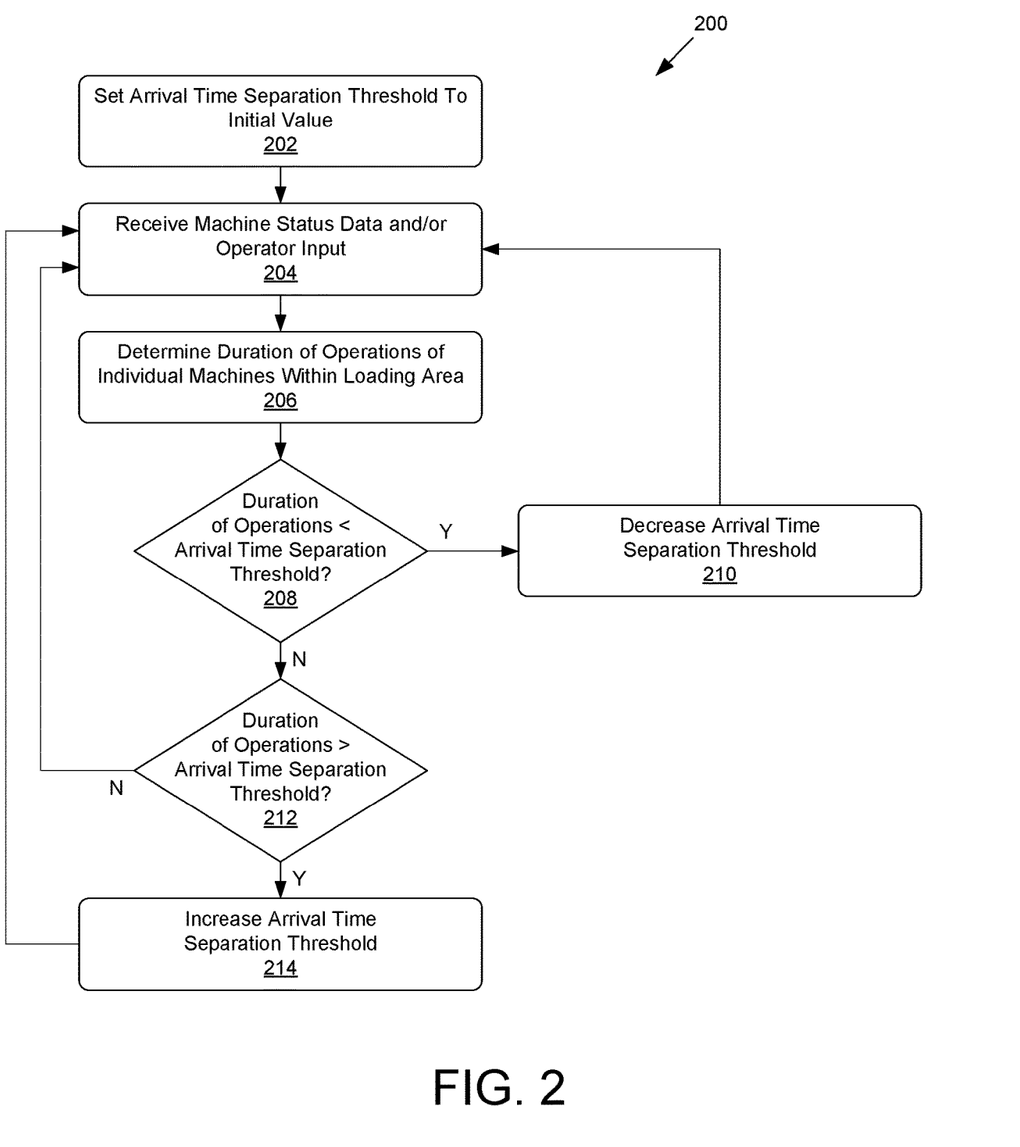
FIG. 2 shows a flowchart illustrating an example process for adjusting an arrival time separation threshold.

FIG. 2 shows a flowchart 200 illustrating an example process for adjusting the arrival time separation threshold 114. The operations shown in FIG. 2 can be performed by the computing system 102. As discussed above, the computing system 102 can be the user device 128 operated by the human operator 124, or can be a separate server or computing device. FIG. 4, discussed further below, describes an example system architecture for the computing system 102.

At block 202, the computing system 102 can set the arrival time separation threshold 114 to an initial value. In some examples, the initial value for the arrival time separation threshold 114 can be a predetermined default or starting value. In other examples, the initial value for the arrival time separation threshold 114 can be based on an operator profile of the human operator 124. For example, if the operator profile indicates that the human operator 124 is relatively inexperienced, the computing system 102 can set the arrival time separation threshold 114 to a default value for inexperienced operators that is relatively high, to provide inexperienced operators with more time between arrivals of machines 104 at the loading area 108. However, if the if the operator profile indicates that the human operator 124 is instead relatively experienced, the computing system 102 can set the arrival time separation threshold 114 to a default value for experienced operators that is relatively low, as more experienced operators may be more likely to be able to handle more frequent staggered arrivals of machines 104 at the loading area 108.

At block 204, the computing system 102 can receive machine status data 120 associated with the machines 104, and/or operator input 126 indicating how the human operator 124 operates the machines 104 at the loading area 108. The machine status data 120 can indicate times when the machines 104 arrive at, and/or depart the loading area 108, information about operations performed by the machines 104 while the machines 104 are within the loading area 108, and/or other information. The operator input 126 can also, or alternately, indicate types, times, and/or durations of operations the machines 104 perform within the loading area 108 based on operator input 126 provided by the human operator 124. In examples in which the machines 104 are fully autonomous and the human operator 124 is not present or providing operator input 126, the computing system 102 can receive machine status data 120 without operator input 126 at block 204.

At block 206, the computing system 102 can determine a duration of operations of individual machines 104 within the loading area 108. The computing system 102 can determine the duration of the operations of the machines 104 within the loading area 108 based on the machine status data 120 and/or operator input 126 received at block 206. In some examples, the duration can be an average duration of such operations over a period of time, such as the previous day or previous hour. The average duration can, for example, be an average amount of time it takes for a machine to enter the loading area 108, pick up material from the material source 116 via autonomous operations or based on operator input 126, and to leave the loading area 108. In other examples, the duration can be based on a maximum duration of an instance of such operations during a period of time.

At block 208, the computing system 102 can determine whether the duration determined at block 206 is less than the current value of the arrival time separation threshold 114. If the arrival time separation threshold value 114 has not yet been adjusted, the current value of the arrival time separation threshold 114 can be the initial value set at block 202.

If the duration determined at block 206 is less than the current value of the arrival time separation threshold 114 (Block 208—Yes), the computing system 102 can decrease the arrival time separation threshold at block 210. For example, if the current value of the arrival time separation threshold 114 had been 60 seconds, but the machine status data 120 and/or operator input 126 indicate that on average machines 104 have been performing operations within loading area 108 in 45 seconds, the computing system 102 can decrease the arrival time separation threshold 114 to 45 seconds, or a value that is between 60 seconds and 45 seconds. Accordingly, the machine dispatcher 134 can begin issuing machine instructions 112 that may cause machines 104 to arrive more frequently at the loading area 108, for instance at times that are separated at least by the lowered arrival time separation threshold 114.

If the duration determined at block 206 is not less than the current value of the arrival time separation threshold 114 (Block 208—No), at block 212 the computing system 102 can determine whether the duration determined at block 206 is greater than the current value of the arrival time separation threshold 114. If the duration determined at block 206 is greater than the current value of the arrival time separation threshold 114 (Block 212—Yes), the computing system 102 can increase the arrival time separation threshold at block 214. For example, if the current value of the arrival time separation threshold 114 had been 60 seconds, but the machine status data 120 and/or operator input 126 indicate that on average machines 104 have been performing operations within loading area 108 in 85 seconds, the computing system 102 can increase the arrival time separation threshold 114 to 85 seconds or greater. Accordingly, the machine dispatcher 134 can begin issuing machine instructions 112 that may cause machines 104 to arrive less frequently at the loading area 108, for instance at times that are separated at least by the increased arrival time separation threshold 114.

If the duration determined at block 206 is not greater than the current value of the arrival time separation threshold 114, such that the duration is equal to the current value of the arrival time separation threshold 114 (Block 212— No), the computing system 102 can continue using the current value of the arrival time separation threshold 114.

In some examples, the computing system 102 can determine whether the duration determined at block 206 is less than and/or above the current value of the arrival time separation threshold 114 at block 208 and/or block 212 if the duration is less than and/or above the current value of the arrival time separation threshold 114 by more than a buffer value or threshold percentage. For example, if the value of the arrival time separation threshold 114 had been 60 seconds, but the machine status data 120 and/or operator input 126 indicate that on average machines 104 have been performing operations within loading area 108 in 58 seconds, and the two-second difference between the duration and the arrival time separation threshold 114 is less than a five second buffer value, the computing system 102 may be configured to avoid decreasing the arrival time separation threshold 114 at block 210, and may instead maintain the 60 second value of the arrival time separation threshold 114.

After adjusting the arrival time separation threshold 114 to a lower value at block 210 or to a higher value at block 214, or after determining not to adjust the arrival time separation threshold 114, the computing system 102 can receive additional machine status data 120 and/or operator input 126 at block 204. Accordingly, if the additional machine status data 120 and/or operator input 126 indicates, at a subsequent pass through block 206, a decrease or increase of the duration of operations of individual machines 104 within the loading area 108 over time, the computing system 102 may respond to the decrease or increase of the duration of the operations by correspondingly decreasing or increasing the arrival time separation threshold 114 at block 210 or block 214 as described above. The computing system 102 can accordingly dynamically adjust the arrival time separation threshold 114 based on changes to the amounts of time it takes for individual machines 104 to autonomously, or in response to operator input 126, perform operations within the loading area 108.

As discussed above, the computing system 102 can also, based on setting and/or adjusting the arrival time separation threshold 114, generate machine instructions 112 that cause machines 104 to arrive at the loading area 108 at times that are separated by at least the arrival time separation threshold 114. A process for generating the machine instructions 112 based on the arrival time separation threshold 114 is discussed further below with respect to FIG. 3.

Figure 3:
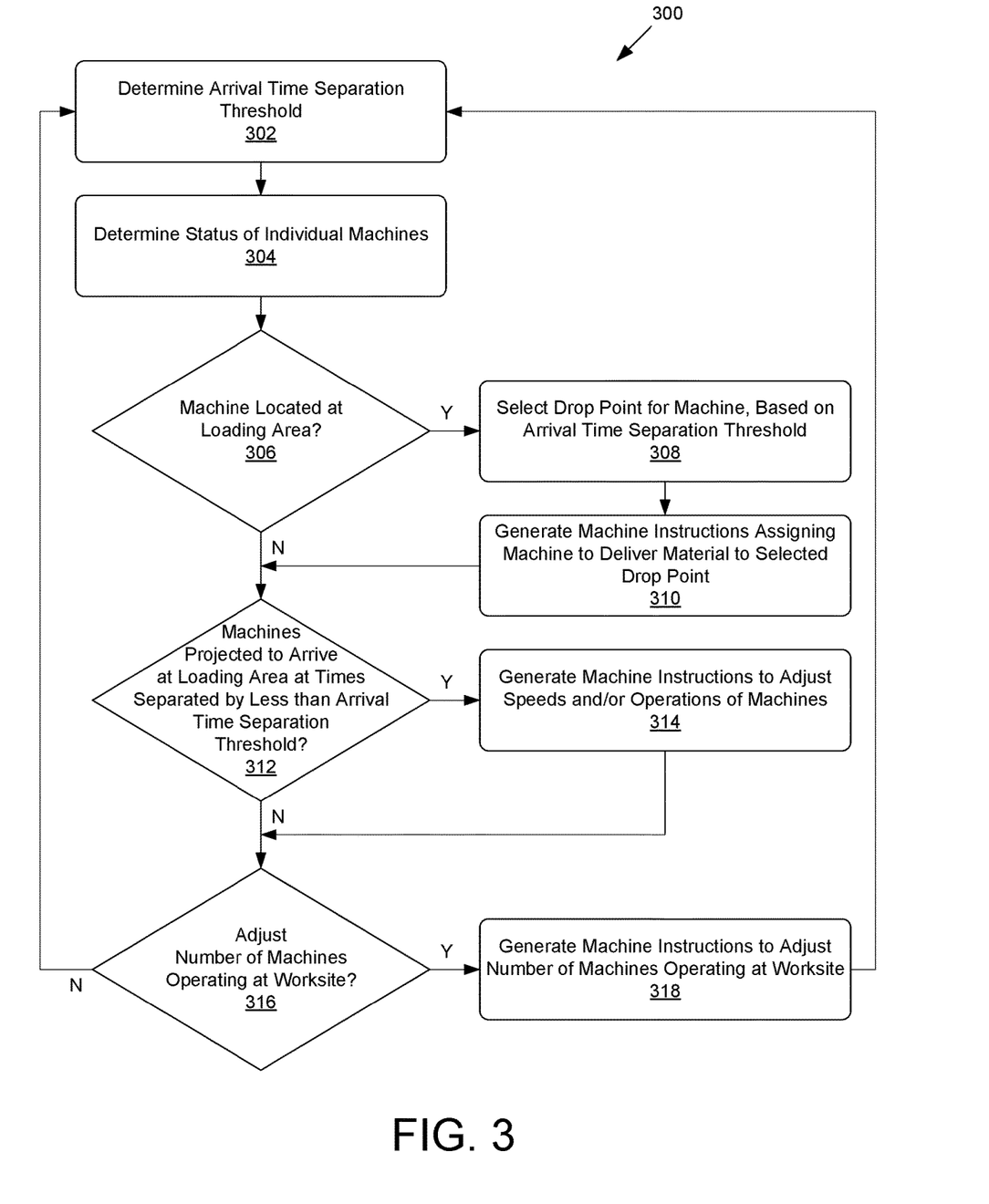
FIG. 3 shows a flowchart illustrating an example process for generating machine instructions associated with one or more machines.

FIG. 3 shows a flowchart 300 illustrating an example process for generating machine instructions 112 associated with one or more machines 104. The operations shown in FIG. 3 can be performed by the computing system 102. As discussed above, the computing system 102 can be the user device 128 operated by the human operator 124, or can be a separate server or computing device. FIG. 4, discussed further below, describes an example system architecture for the computing system 102.

At block 302, the computing system 102 can determine the arrival time separation threshold 114. In some examples, the arrival time separation threshold 114 can be a predetermined value. In other examples, the arrival time separation threshold 114 can be set and/or dynamically adjusted by the computing system 102, for example via the process shown in FIG. 3.

At block 304, the computing system 102 can determine the status of individual machines 104 at the worksite 106. For example, the computing system 102 can use machine status data 120, operator input 126, job information 138, and/or other information to determine locations of individual machines 104, current travel speeds of individual machines 104, whether individual machines 104 are traveling to or from drop points 110, whether individual machines 104 are in a loaded or unloaded state, and/or any other information associated with the status of the individual machines 104.

At block 306, the computing system 102 can determine whether any of the machines 104 is located at the loading area 108. Such a machine may have arrived at the loading area 108 and may have already picked up, or is in the process of picking up, material from the material source 116 via autonomous operations or based on operator input 126. Such a machine may be, or may soon be, ready to travel in a loaded state to one of the drop points 110 at the worksite 106, in order to deliver the material to the drop point. Accordingly, if such a machine is located at the loading area 108 (Block 306—Yes), the computing system 102 can select one of the drop points 110 for the machine at block 308, and can generate machine instructions 112 at block 310 that cause the machine to travel to the selected drop point and deliver the material to the selected drop point. The computing system 102 can also transmit the machine instructions 112 generated at block 310 to the associated machine.

The computing system 102 can select the drop point at block 308 based at least in part on the arrival time separation threshold 114, such that the machine is projected to arrive back at the loading area 108 from the selected drop point at a time that is separated by at least the arrival time separation threshold 114 after another machine is projected to arrive at the loading area 108. For example, the computing system 102 can select the drop point, out of a set of drop points 110 where material has not yet been delivered, based on expected and/or simulated travel speeds of the machine to and/or from the drop point, and/or expected and/or simulated times for the machine to perform material drop-off operations at the drop point, such that the machine is projected to arrive back at the loading area 108 at a time that is at least the arrival time separation threshold 114 after another machine is projected to arrive at the loading area 108.

In some examples, the computing system 102 can select the drop point at block 308 based on simulations of the machine and/or other machines 104 performed by the machine simulator 136. As an example, the computing system 102 can select the drop point out of a set of candidate drop points 110, based on simulations indicating which of the drop points 110 would, based on simulated travel times to and from the drop point and/or simulated times for operations of the machine at the drop point, cause the machine to arrive back at the loading area 108 at a time that is at least the arrival time separation threshold 114 after a time that simulations indicate another machine would arrive at the loading area 108.

After generating machine instructions 112 associated with a selected drop point for a machine located within the loading area 108 at block 310, or if a machine is not currently in the loading area 108 (Block 306—No), at block 312 the computing system 102 can determine whether multiple machines 104 are projected to arrive at the loading area 108 at times that are separated by less than the arrival time separation threshold 114. For example, based on current locations and/or speeds associated with two machines 104, and/or corresponding simulations performed by the machine simulator 136, the computing system 102 may determine that the two machines 104 would arrive at the loading area 108 at the same time, or at different times that are separated by less than the arrival time separation threshold 114.

Accordingly, if the computing system 102 determines that multiple machines 104 are projected to arrive at the loading area 108 at times that are separated by less than the arrival time separation threshold 114 (Block 312—Yes), the computing system 102 can generate machine instructions 112 at block 314 to adjust the speeds and/or other operations of one or both of the two machines 104. The computing system 102 can also transmit the machine instructions 112 generated at block 314 to the associated machines 104. Accordingly, by adjusting the speeds and/or other operations of one or both of the machines 104 via the machine instructions 112 generated at block 314, the computing system 102 can cause the two machines 104 to arrive at the loading area 108 at times that are separated by at least the arrival time separation threshold 114. For example, the machine instructions 112 generated at block 314 can cause one of the machines 104 to speed up, and/or the other machine to slow down, such that the difference between the projected times that the machines 104 will arrive at the loading area 108 is increased to a value that is equal to or above the arrival time separation threshold 114.

After generating machine instructions 112 to adjust speeds and/or operations of one or more machines 104 at block 314, or if multiple machines 104 are not projected to arrive at the loading area 108 at times that are separated by less than the arrival time separation threshold 114 (Block 312—No), at block 316 the computing system 102 can determine whether to adjust the number of machines 104 operating at the worksite 106. For example, the computing system 102 may determine that there is an excess of machines 104 operating at the worksite 106, such that changes in speeds or other operations of machines 104, and/or selections of drop points 110, are not sufficient to prevent machines 104 from arriving at the loading area 108 more frequently than the arrival time separation threshold 114. Similarly, the computing system 102 may determine that there are too few machines 104 operating at the worksite 106, such that one or more additional machines 104 could be brought online to operate at the worksite 106 without causing machines to arrive at the loading area 108 more frequently than the arrival time separation threshold 114.

In some examples, the computing system 102 can be configured to prioritize selecting drop points 110 for machines 104 at blocks 308 and 310, and/or adjusting speeds and/or operations of the machines 104 at block 314, over adjusting the number of machines 104 operating at the worksite 106. For example, the computing system 102 can be configured to avoid adjusting the number of machines 104 operating at the worksite 106 more frequently than a threshold frequency, or to above or below threshold numbers of machines 104. Accordingly, if the computing system 102 for example determines that the number of machines 104 operating at the worksite 106 was recently decreased and it is not yet time to consider another decrease in the number of machines 104 operating at the worksite 106, or if the number of machines 104 operating at the worksite 106 is already at a minimum number, the computing system 102 may determine at block 316 not to adjust the number of machines 104 operating at the worksite 106. However, if the computing system 102 determines that more than a threshold period of time has passed since a previous adjustment to the number of machines 104 operating at the worksite 106, and/or that an adjustment to the number of machines 104 operating at the worksite 106 would not bring the number of machines 104 operating at the worksite 106 below a minimum number or to above a maximum number, at block 316 the computing system 102 can determine whether adjusting the number of machines 104 operating at the worksite 106 would help lead to machines 104 arriving at the loading area 108 at staggered arrival times that are separated by at least the arrival time separation threshold 114.

Accordingly, if the computing system 102 determines to adjust the number of machines 104 operating at the worksite 106 (Block 316—Yes), at block 318 the computing system 102 can generate machine instructions 112 that adjust the number of machines 104 operating at the worksite 106. In some examples, the computing system 102 can also transmit the machine instructions 112 generated at block 318 to the associated machines 104. For example, the machine instructions 112 generated at block 318 can cause one or more machines 104 that had been operating at the worksite 106 to travel to a parking area and to power down, or one or more machines 104 that had been parked at the parking area to power up and to travel to worksite 106 to begin performing operations. In other examples, the computing system 102 can transmit the machine instructions 112 generated at block 318, or a corresponding recommendation or notification, to a separate worksite-level controller or to computing device of a human worksite manager, such that the separate worksite-level controller or human worksite manager can implement the change to the number of machines 104 operating at the worksite 106.

After generating machine instructions 112 to adjust the number of machines 104 operating at the worksite 106, or if the computing system 102 determined not to adjust the number of machines 104 operating at the worksite 106 (Block 316—No), the computing system 102 can return to block 302 to repeat the process shown in FIG. 3. For example, if the arrival time separation threshold has been changed, for instance via the process shown in FIG. 3, the computing system 102 can determine the new value of the arrival time separation threshold 114 at block 302. The computing system 102 can also, or alternately, determine whether another machine is now in the loading area 108 at block 306. The computing system 102 can also, or alternately, use new machine status data 120 and/or the same or an adjusted value of the arrival time separation threshold 114 to determine at block 312 whether multiple machines 104 are projected to arrive at the loading area at times that are separated by less than the arrival time separation threshold 114. The computing system 102 can also, or alternately, use new machine status data 120 and/or the same or an adjusted value of the arrival time separation threshold 114 to determine at block 316 whether to adjust the number of machines 104 operating at the worksite 106.

The computing system 102 can accordingly repeat the process shown in FIG. 3 to enforce the arrival time separation threshold 114 over time, for example by selecting drop points for machines 104 and/or adjusting machine operations to control arrival times of individual machines 104 at the loading area 108.

FIG. 4 shows an example system architecture 400 for the computing system 102. As discussed above, the computing system 102 can be the user device 128 operated by the human operator 124, or can be a separate server or computing device. In examples in which the user device 128 is separate from the computing system 102, the user device 128 can have a system architecture that is similar to the system architecture shown in FIG. 4. Other computing systems described herein, such as the ECM 118 or other on-board computing systems of a machine, can also have a system architecture that is similar to the system architecture shown in FIG. 4. The computing system 102 can include one or more processors 402, memory 404, and communication interfaces 406.

The processor(s) 402 can operate to perform a variety of functions as set forth herein. The processor(s) 402 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 402 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 402 can also access content and computer-executable instructions stored in the memory 404, and execute such computer-executable instructions.

The memory 404 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 402 to perform the operations described herein.

For example, the memory 404 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 402 and/or communication interface(s) 406 during execution thereof by the computing system 102. For example, the processor(s) 402 can possess local memory, which also can store program modules, program data, and/or one or more operating systems.

The memory 404 can store data and/or computer-executable instructions associated with the job information 138, the arrival time separation threshold manager 132, the machine dispatcher 134, the machine simulator 136, and/or other elements described herein. As discussed above, the job information 138 can include the arrival time separation threshold 114, the worksite information 140, the machine information 142, and/or the operator information 144. The memory 404 can also store other modules and data 408 that can be utilized by the computing system 102 to perform or enable performing any action taken by the computing system 102. For example, the other modules and data 408 can include a platform, operating system, and/or applications, as well as data utilized by the platform, operating system, and/or applications.

The communication interfaces 406 can include transceivers, modems, interfaces, antennas, and/or other components that can transmit and/or receive data over networks or other data connections. In some examples, the communication interfaces 406 can be wireless communication interfaces 130 that the computing system 102 can use to send and/or receive data, such as the machine instructions 112, the machine status data 120, and/or the operator input 126 described herein.

In some examples, the computing system 102 can also have a screen or other display, input devices, output devices, and/or other elements that are not shown in FIG. 4. For example, if the computing system 102 is the user device 128, the computing system 102 can have a screen that can present a user interface, sensor data associated with a machine, and/or other information, such that the human operator 124 can view information via the screen while the human operator 124 controls operations of the machine within the loading area 108.

INDUSTRIAL APPLICABILITY

As described above, the computing system 102 can determine the arrival time separation threshold 114, and manage a fleet of machines 104 via machine instructions 112 to cause machines 104 to arrive at the loading area 108 at staggered arrival times that are separated by at least the arrival time separation threshold 114. Accordingly, by causing the machines 104 to arrive at the loading area 108 at staggered arrival times, a machine may be able to perform operations within the loading area 108 and/or depart the loading area 108 before the next machine arrives at the loading area 108. Accordingly, the computing system 102 can reduce or limit the number of machines 104 that may be present at the loading area 108 or are waiting to enter the loading area 108 at any point in time, reduce congestion at or around the loading area 108, reduce machine idle times, provide enough time for the human operator 124 to operate each machine within the loading area 108, and/or provide other benefits.

For example, if a first machine and a second machine were to approach the loading area 108 at the same time, the first machine may be able to enter and operate within the loading area 108, but the second machine may have to idle at or near an entrance to the loading area 108 until the first machine departs the loading area 108. The second machine may consume fuel while idling, and also may not be able to perform productive work at the worksite 106 while idling. In some situations, the idling second machine may also block, or partially block, egress of the first machine from the loading area 108. These issues may be compounded if additional machines 104 arrive at the loading area 108 and idle while waiting in a queue of machines 104 to enter the loading area 108.

However, because the computing system 102 can cause machines 104 to arrive at the loading area 108 at staggered arrival times as described herein, a preceding machine may have already departed the loading area 108 or may be about to depart the loading area 108 when each machine arrives at the loading area 108. Accordingly, waiting and/or idling times for each machine, that might otherwise exist before each machine can enter the loading area 108, can be reduced or eliminated. Reducing or eliminating such waiting and/or idling times can result in overall lower fuel consumption and/or increased productivity levels associated with the machines 104 and/or the worksite 106.

The computing system 102 can cause machines 104 to arrive at the loading area 108 at staggered arrival times separated by at least the arrival time separation threshold 114 based on selecting the drop points 110 that individual machines 104 are assigned to travel to and from, based on controlling travel speeds of the machines 104, and/or controlling other operations of the machines 104 as described above. In some examples, the computing system 102 can also cause machines 104 to arrive at the loading area 108 at staggered arrival times separated by at least the arrival time separation threshold 114 by adjusting the number of machines 104 operating at the worksite 106. However, in some examples, the computing system 102 can limit impacts to overall productivity at the worksite 106 by prioritizing selecting drop points 110 for machines 104, controlling speeds of machines 104, and/or controlling other operations of machines 104 over adjusting the number of machines 104 operating at the worksite 106, for instance by not changing the number of machines 104 operating at the worksite 106 more frequently than a threshold frequency or by not reducing the number of machines 104 operating at the worksite 106 to lower than a minimum number of machines 104.

In examples in which the human operator 124 at least partially controls each machine within the loading area 108, staggering the arrival times of the machines 104 to the loading area 108 can avoid overwhelming the human operator 124. For example, rather than two or machines 104 arriving at the loading area 108 at the same time, or being queued up to be loaded with material at the loading area 108, such that the human operator 124 feels pressure to operate each machine quickly to reduce the number of machines 104 that are idling while waiting to be controlled, the computing system 102 can cause the machines 104 to arrive at staggered times separated by at least the arrival time separation threshold 114 as described herein. Accordingly, the human operator 124 can operate individual machines 104 when the machines 104 arrive at the different staggered arrival times, thereby reducing pressure on the human operator 124 and avoiding overwhelming the human operator 124.

As described above, in some examples, the computing system 102 can set or adjust the arrival time separation threshold 114 based on experience and/or performance of the human operator 124. For example, if the human operator 124 tires during a workday and starts to slow down manually-controlled operations of machines 104 at the loading area 108, the computing system 102 can increase the arrival time separation threshold 114 and issue corresponding machine instructions 112 that cause machines 104 to arrive at the loading area 108 less frequently. For instance, the computing system 102 may begin assigning machines 104 to drop off material to selected drop points 110 that are farther away from the loading area 108, so that the machines 104 take longer to return to the loading area 108 and arrival times of the machines 104 to the loading area 108 can be separated by the increased arrival time separation threshold 114. Accordingly, by adjusting the arrival time separation threshold 114 based on the performance of the human operator 124, overall waiting and/or idling times of machines 104 can be reduced or eliminated, thereby reducing overall fuel consumption levels and/or increasing productivity levels associated with the machines 104 and/or the worksite 106.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A method comprising:
   determining, by a processor, an arrival time separation threshold associated with a plurality of machines at a worksite, wherein:
   a plurality of drop points is located at the worksite,
   an individual machine, of the plurality of machines, is configured to, during a corresponding delivery task:
   be loaded with material at a loading area of the worksite, and
   after departing the loading area and before returning to the loading area, deliver the material to a single drop point, of the plurality of drop points, assigned to the individual machine, and the arrival time separation threshold indicates a minimum period of time between times at which individual machines, of the plurality of machines, arrive at the loading area;
assigning, by the processor, respective single drop points, of the plurality of drop points, to the individual machines in association with corresponding delivery tasks based at least in part on estimated times for the individual machines to:
  travel from the loading area to the respective single drop points,
  deliver the material to the respective single drop points, and
  return to the loading area at staggered arrival times that are separated by at least the arrival time separation threshold; and
generating, by the processor, machine instructions that cause the individual machines to arrive at the loading area at the staggered arrival times, separated byat least the arrival time separation threshold, by causing the individual machines to deliver the material to the respective single drop points assigned to the individual machines before returning to the loading area.

2. The method of claim 1, wherein the individual machines are autonomous or semi-autonomous, and are configured to travel between the loading area and the respective single drop points based on the machine instructions.

3. The method of claim 1, wherein:
machine status data, provided by the individual machines, indicates at least one of locations or travel speeds of the individual machines at the worksite, and
at least one of assigning the respective single drop points to the individual machines, or generating the machine instructions, is based at least in part on the machine status data associated with the individual machines.

4. The method of claim 1, wherein the machine instructions instruct at least one of the individual machines to change a travel speed to cause the individual machines to arrive at the loading area at the staggered arrival times.

5. The method of claim 1, further comprising causing the individual machines to arrive at the loading area at the staggered arrival times by adjusting a quantity of machines, in the plurality of machines, that operate at the worksite.

6. The method of claim 1, wherein the worksite is a solar farm construction site, and the material is at least one of solar panels or solar panel installation equipment.

7. The method of claim 1, wherein the individual machines perform loading operations at the loading area autonomously, and the arrival time separation threshold is determined based at least in part on one or more durations of one or more of the loading operations previously performed by the individual machines.

8. The method of claim 1, wherein the individual machines perform loading operations at the loading area based on operator input provided by a human operator, and the arrival time separation threshold is determined based on at least one of:
an experience level of the human operator, and
one or more durations of one or more of the loading operations previously performed by the individual machines based on the operator input provided by the human operator.

9. The method of claim 8, further comprising adjusting, by the processor, the arrival time separation threshold based on corresponding trends indicating changes, over time, in the one or more durations of the one or more of the loading operations previously performed based on the operator input.

10. The method of claim 1, wherein:
the material comprises construction material, and
the plurality of drop points are located proximate to installation locations, at the worksite, for the construction material.

11. The method of claim 1, further comprising determining, by the processor, the estimated times by simulating operations of the individual machines to:
travel from the loading area to the respective single drop points,
deliver the material to the respective single drop points, and
return to the loading area from the respective single drop points.

12. The method of claim 11, wherein the operations are simulated based on at least one of:
passable routes at the worksite between the loading area and the plurality of drop points, terrain conditions at the worksite,
weather conditions at the worksite,
locations of other machines, of the plurality of machines, at the worksite, speeds of the other machines, or
weights carried by the individual machines during outbound travel from the loading area to the respective single drop points and during return travel from the respective single drop points to the loading area.

13. The method of claim 1, wherein the individual machine is assigned to, during different delivery tasks, deliver the material to different single drop points.

14. A computing system comprising:
a processor; and
a memory storing computer-executable instructions that, when executed by the processor, cause the processor to:
  determine an arrival time separation threshold associated with a plurality of machines at a worksite, wherein:
    a plurality of drop points is located at the worksite,
    an individual machine, of the plurality of machines, is configured to, during a corresponding delivery task:
      be loaded with material at a loading area of the worksite, and
      after departing the loading area and before returning to the loading area,
      deliver the material to a single drop point, of the plurality of drop points,
      assigned to the individual machine, and
    the arrival time separation threshold indicates a minimum period of time between times
    at which individual machines, of the plurality of machines, arrive at the loading area;
  assign respective single drop points, of the plurality of drop points, to the individual machines in association with corresponding delivery tasks based at least in part on estimated times for the individual machines to:
    travel from the loading area to the respective single drop points,
    deliver the material to the respective single drop points, and
    return to the loading area at staggered arrival times that are separated by at least the arrival time separation threshold; and
  generate machine instructions that cause the individual machines to arrive at the loading area at the staggered arrival times, separated by at least the arrival time separation threshold, by causing the individual machines to deliver the material to the respective single drop points assigned to the individual machines before returning to the loading area.

15. The computing system of claim 14, wherein:

the individual machines perform loading operations at the loading area based on operator input provided by a human operator, and the computing system is a user device, operated by the human operator, that is configured to:

accept the operator input from the human operator, and remotely control the loading operations of the individual machines at the loading area based on the operator input.

16. The computing system of claim 15, wherein the processor determines the arrival time separation threshold based on at least one of:

an experience level of the human operator, and one or more durations of one or more of the loading operations previously performed by the individual machines based on the operator input provided by the human operator.

17. A system comprising:

a plurality of machines at a worksite, wherein:

a plurality of drop points is located at the worksite, and an individual machine, of the plurality of machines, is configured to, during a corresponding delivery task:

be loaded with material at a loading area of the worksite, and after departing the loading area and before returning to the loading area, deliver the material to a single drop point, of the plurality of drop points, assigned to the individual machine; and a computing system, associated with the worksite, configured to:

determine an arrival time separation threshold that indicates a minimum period of time between times at which individual machines, of the plurality of machines, arrive at the loading area;

assign respective single drop points, of the plurality of drop points, to the individual machines in association with corresponding delivery tasks based at least in part on estimated times for the individual machines to:

travel from the loading area to the respective single drop points, deliver the material to the respective single drop points, and return to the loading area at staggered arrival times that are separated by at least the arrival time separation threshold; and generate machine instructions that cause the individual machines to arrive at the loading area at the staggered arrival times, that are separated by at least the arrival time separation threshold, by causing the individual machines to deliver the material to the respective single drop points assigned to the individual machines before returning to the loading area.

18. The system of claim 17, wherein the computing system is a user device that is further configured to:

accept operator input from a human operator, and remotely control operations of the individual machines at the loading area based on the operator input.

19. The system of claim 17, wherein the plurality of machines and the computing system comprise wireless communication interfaces that create a wireless mesh network at the worksite, and the machine instructions are transmitted via the wireless mesh network.

20. The system of claim 17, wherein the machine instructions instruct at least one of the individual machines to change a travel speed to cause the individual machines to arrive at the loading area at the staggered arrival times.

\* \* \* \* \*